United States Patent [19]

Perlman et al.

[11] Patent Number: 5,583,576
[45] Date of Patent: Dec. 10, 1996

[54] RATING-DEPENDENT PARENTAL LOCK-OUT FOR TELEVISION RECEPTION

[75] Inventors: William Perlman, Ashfield; Richard Leghorn, Hyannis, both of Mass.

[73] Assignee: OKTV, Inc., Cambridge, Mass.

[21] Appl. No.: 526,789

[22] Filed: Sep. 11, 1995

[51] Int. Cl.⁶ .............................. H04N 7/08; H04N 7/084
[52] U.S. Cl. .......................... 348/460; 348/5.5; 348/906; 348/10
[58] Field of Search .................................. 348/55, 10, 7, 348/13, 460, 734, 906; 455/26.1; H04N 7/08, 7/084

[56] References Cited

U.S. PATENT DOCUMENTS

| | | | |
|---|---|---|---|
| 4,228,543 | 10/1980 | Jackson | 455/181 |
| 4,232,396 | 11/1980 | Grimes | 455/179 |
| 4,706,121 | 11/1987 | Young | 348/906 |
| 4,718,107 | 1/1988 | Hayes | 455/4 |
| 4,768,229 | 8/1988 | Benjamin et al. | 380/20 |
| 4,888,796 | 12/1989 | Olivo, Jr. | 329/107 |
| 4,930,158 | 5/1990 | Vogel | 380/5 |
| 4,930,160 | 5/1990 | Vogel | 380/23 |
| 5,033,085 | 7/1991 | Rew | 380/20 |
| 5,038,211 | 8/1991 | Hallenbeck | 358/142 |
| 5,172,111 | 12/1992 | Olivo, Jr. | 340/825.31 |
| 5,195,135 | 3/1993 | Palmer | 380/20 |
| 5,200,822 | 4/1993 | Bronfin et al. | 358/142 |
| 5,253,066 | 10/1993 | Vogel | 380/23 |
| 5,270,822 | 12/1993 | Choi | 358/188 |
| 5,371,795 | 12/1994 | Vogel | 358/188 |
| 5,382,983 | 1/1995 | Kwoh et al. | 348/716 |
| 5,418,853 | 5/1995 | Kanata et al. | 380/5 |

*Primary Examiner*—Glenton B. Burgess
*Attorney, Agent, or Firm*—Curtis, Morris & Safford, P.C.

[57] ABSTRACT

A technique for selectively inhibiting television receiving apparatus from displaying those television programs which satisfy predetermined content ratings criteria. Television program information associated with television programs that are receivable by the television receiving apparatus during a selected time interval, such as channel data representing the channels on which the television programs are received and rating data representing the contents of those programs, is stored. A rating code representing the content ratings criteria of those programs which a viewer wishes to inhibit from being displayed also is stored. When a desired channel is selected by the viewer, the stored rating data associated with that channel is compared with the rating code to determine if the television program transmitted on that channel satisfies the predetermined content ratings criteria. If so, the channel on which that television program is transmitted is blocked and the stored television program information associated with those television programs having rating data which do not satisfy the predetermined content ratings criteria then are displayed to permit the viewer to select an acceptable television program.

23 Claims, 4 Drawing Sheets

RATING-DEPENDENT PARENTAL LOCK-OUT FOR TELEVISION RECEPTION

BACKGROUND OF THE INVENTION

This invention relates to selectively inhibiting television receiving apparatus from displaying television programs which satisfy predetermined content ratings criteria and, more particularly, to a technique for blocking the display of a television program having undesirable content, such as violence, nudity, etc., while displaying acceptable television programs that could be received as an alternative in place of the undesired program.

Techniques have been proposed heretofore to permit viewers to selectively enable and disable television receiving apparatus to prevent undesirable television programming from being received and/or displayed. With the introduction of what is known as an electronic program guide (EPG), television program information which identifies the individual television programs that are transmitted over available broadcast channels, together with the time of day that each such program is broadcasted, now can be transmitted to television receivers, either by cable transmission, direct satellite broadcast transmission or conventional over-the-air transmission. Such electronic television scheduling permits a user to display those television programs which are available throughout the day, week, months, etc.

EPG data may be transmitted over a separate transmission channel, received by an EPG tuner tuned to that channel and stored for selective display on, for example, the display screen of a television receiver whenever a viewer wishes to retrieve and view such EPG data. The EPG tuner and storage device may be incorporated into a conventional television receiver or into a decoder of the type typically used in cable television or direct satellite broadcast systems. Such decoders or converters are known and, consistent with industry usage, are referred to herein, as set-top converters.

It often is desirable, and several systems heretofore have been proposed, to selectively block the reception and/or display of television programs due to, for example, the content of such programs. For example, parents often wish to prevent the reception of television programs that are of a violent nature or that contain explicit nudity, or are obscene or otherwise repugnant. Such parental lock-out systems serve to block entire broadcast channels. That is, the reception or display of a television program that is broadcast on a particular channel is prevented. In other systems, the reception of television programs on particular channels broadcast during certain times of the day is inhibited. The television receiver may be tuned to that broadcast channel at certain times; but during late evening hours, for example, when the content of the television programs broadcast on that channel is unsuitable to be observed by children, the reception or display of that broadcast channel is blocked.

It is desirable to utilize EPG data to assist in automatically blocking the display of certain types of television programs. The present invention proceeds upon the desirability of "weighting" each television program relative to a standard and then selectively enabling television receiver apparatus to display that program if its "weight" is sufficient. Stated otherwise, the present invention proceeds in accordance with rating criteria which, for example, provides a numerical value of the degree of violence, nudity, obscenity, etc. of each television program. Such rating criteria, or data, is expected to be transmitted as part of the EPG data and, thus, is readily available for comparison with a viewer's own determination of whether that rating data exceeds the user's own rating code.

OBJECTS OF THE INVENTION

Therefore, it is an object of the present invention to provide a technique by which television receiving apparatus is selectively inhibited from displaying those television programs which a user subjectively determines are undesirable.

Another object of this invention is to provide a technique as aforesaid, which additionally displays television program information representing those television programs which are acceptable to the viewer and which can be received and displayed in place of those television programs which are undesirable.

A further object of this invention is to provide a technique as aforesaid, wherein a list of acceptable television programs is displayed whenever a viewer selects a particular television channel that presently contains an unacceptable television program.

An additional object of this invention is to selectively inhibit the display of those television programs which contain unacceptable material, such as excessive violence, nudity, obscenity, etc.

Various other objects, advantages and features of the present invention will become readily apparent from the ensuing detailed description, and the novel features will be particularly pointed out in the appended claims.

SUMMARY OF THE INVENTION

In accordance with this invention, television receiving apparatus is selectively inhibited from displaying those television programs which are unacceptable. As described herein, an unacceptable television program is one which satisfies predetermined content ratings criteria, that is, those television programs which are identified as having high levels of violence, nudity, obscenity or other undesirable content. Television program information associated with television programs that are receivable by the television receiving apparatus during a selected time interval, such as during a particular half hour, hour, two hours, day or week, is stored. This stored television program information represents the channels on which different television programs are received and rating data representing the content of those programs. For example, the rating data may be a numerical value which represents the amount of violence, nudity, obscenity, etc., of a respective program. A rating code representing the content ratings criteria of programs which the viewer wishes to inhibit from being displayed also is stored. As an example the rating code likewise may be a numerical value which is compared to the rating data associated with the television program that is received on a channel which the viewer may select for display. If the rating data of that television program satisfies the predetermined content ratings criteria, for example, if the rating data is equal to a greater than the stored rating code, the television receiving apparatus is inhibited from displaying the television program that is received on the channel that has been selected. Additionally, television program information associated with those television programs having rating data which do not satisfy the predetermined content ratings criteria but which, nevertheless, can be received in place of the television program which is inhibited is displayed.

In a preferred embodiment, the television program information which is stored is transmitted from a source to the television receiving apparatus and includes a viewing schedule of those television programs to be transmitted from the source during a predetermined time interval. The transmitted viewing schedule includes the channel, title and rating data of each television program and this viewing schedule is stored at the television receiving apparatus. For example, the viewing schedule may include start time data representing the time at which the transmission of each television program begins, program length data representing the duration of each such television program, program type data representing the type of each television program and program description data representing a summary of each such television program. As a preferred feature of the present invention, the rating data, which represents the content of a respective television program, identifies the frequency of occurrence and level of intensity of predetermined acts in that television program. For example, if acts of intense violence occur often throughout a particular television program, the rating data associated with that television program is relatively high.

In accordance with yet another aspect of this invention, information identifying acceptable television programs is displayed as a list which is produced by comparing the rating data associated with a television program receivable on another channel during the same time that the unacceptable television program would have been received to determine if the television program receivable on that other channel is acceptable. If it is, the television program information associated with the acceptable television program is added to the list and the aforementioned steps are repeated. The resulting list then is displayed.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF PREFERRED EMBODIMENTS

Figure 1:
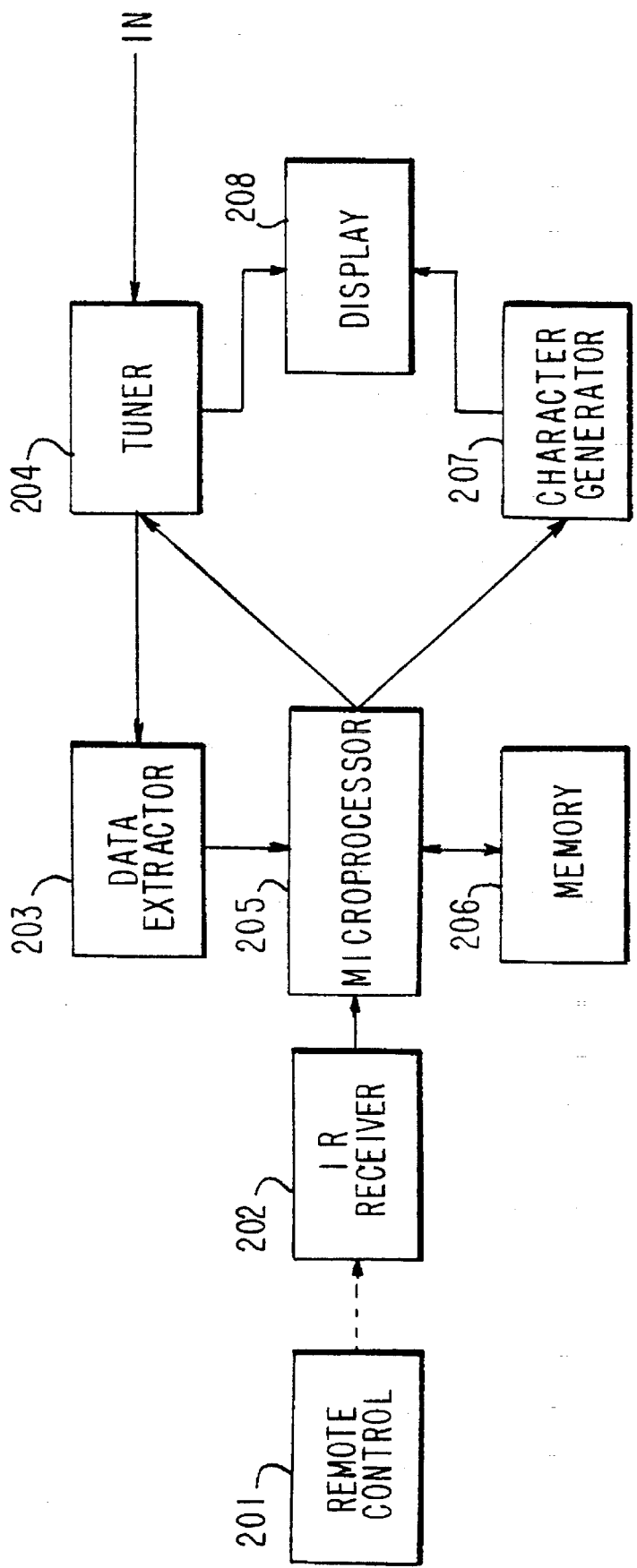
FIG. 1 is a block diagram showing the incorporation of the present invention in television receiving apparatus.

The present invention is readily implemented by presently available television receiving apparatus and electronic components. The invention finds ready application in virtually all commercial television broadcast/distribution systems, including over-the-air broadcasts, wired cable transmission systems and direct satellite broadcast systems. As is conventional, set-top converters typically are used to receive and decode television programs that are transmitted by cable systems or by direct satellite broadcast systems. Normally, such set-top converters are not needed to decode television programs that are transmitted by over-the-air systems. Set-top converters, like other television receiving devices, include tuning circuits (either analog or digital) which are operable to tune to any one of the different broadcast channels that may be received thereby. For example, if the set-top converter is used in a cable transmission system over which 25 different channels of television programming are transmitted, the tuning circuitry included in the converter is adapted to select any one of such 25 channels. Similarly, if the set-top converter is provided in a direct satellite broadcast system over which 150 different broadcast channels of television programming are received, the tuning circuitry included in the converter is adapted to select any one of those 150 different channels. The tuning circuitry included in conventional over-the-air television receiving devices is, of course, adapted to select any of the over-the-air channels that normally are transmitted.

The present invention contemplates the transmission of electronic program guide (EPG) data of the type that presently is available. Typically, such EPG data is transmitted on a predetermined broadcast channel separate and apart from the broadcast channels over which television programming is transmitted. However, EPG data that is multiplexed with television programming likewise may be separated. The former transmission of EPG data is known as out-of-band transmission; and the present discussion refers to such out-of-band transmission in over-the-air broadcast systems, cable distribution systems and direct satellite broadcast systems. In one embodiment, the EPG data includes the following information for each television program that is transmitted: the channel over which that television program is transmitted (i.e., the channel number); the time of day at which the television program is transmitted (e.g., start time); the duration of the television program (i.e., program length); the name of the television program; the type of the television program (e.g., movie, comedy, special, weekly series, etc.); the genre of the television program (e.g., drama, comedy, sporting event, action, etc); and a description of the television program (e.g., the names of the starring performers, a brief summary of the subject matter of the television program, etc.).

In addition to the foregoing information included in the EPG data, it is a feature of the present invention also to include rating data which represents the content of that television program. For example, the rating data may be a numerical value which represents the acceptability of the television program to the viewer. As an analogy with the current motion picture rating designations G, PG, PG-13, R and X, the rating data may exhibit ranges of progressively increasing weight with a range in the lowest weight corresponding to G-rated programs and the range having the highest weight corresponding to X-rated programs. A particular value within a range may be thought of as corresponding to the relative degree of acceptability/unacceptability of the television program. For example, if a television program contains a modest degree of violence that occurs infrequently throughout the program, the rating may be relatively low. However, if that television program contains intense violence that recurs frequently, the rating data is relatively high. It will be appreciated, therefore, that the rating data represents the frequency of occurrence and level of intensity of predetermined acts (e.g., acts of violence or nudity or profanity) in the television program.

An example of EPG data containing the aforementioned rating data may be constructed as follows:

TABLE 1

| FIELD NAME | SIZE IN BYTES |
| --- | --- |
| Channel number | 3 |
| Start time | 5 |
| Program length in minutes | 3 |
| Program name | 50 |
| Program type | 10 |
| Program genre | 10 |
| Description | 256 |
| Rating data | 1 |

Turning now to FIG. 1, there is illustrated a block diagram of television receiver apparatus which incorporates the present invention. The apparatus illustrated in FIG. 1 may be included in a set-top converter, a television receiver, a video recorder or other conventional apparatus typically used to receive and cause the display of television pictures. A remote control unit 201 is adapted to transmit conventional control signals to the television receiving apparatus for controlling various functions such as channel selection, volume control, brightness, contrast, color adjustments, etc. Such control signals may be transmitted by infra-red transmission; and in that event the remote control unit includes an IR transmitter and the television receiving apparatus includes and IR receiver 202. Alternatively, remote control unit 201 and IR receiver 202 may be omitted and the aforementioned control signals may be generated simply by operating corresponding controls directly on the television receiving apparatus (e.g., channel selector, volume adjustment and picture control buttons).

The control signals, whether received by IR receiver 202 or generated by control elements provided directly on the television receiving apparatus, are coupled to a microprocessor 205 which controls the operation of a tuner 204 so as to tune to a selected television channel received at the input of the tuner. For example, the microprocessor may control tuner 204 to tune to a particular broadcast frequency over which a television program is transmitted. Alternatively, the microprocessor may control tuner 204 to tune to a particular digital channel (as in direct satellite broadcast transmission) over which the television program is transmitted. The video signals which constitute the television program broadcast over the selected channel are supplied to a display 208 whereat they are displayed to the viewer. It will be appreciated that display 208 includes the usual video processing circuitry normally provided in television receiving apparatus to permit a television picture (and accompanying audio information) to be displayed to a viewer. The foregoing operation is typical of television receiving apparatus.

In accordance with the present invention, tuner 204 also is adapted to receive EPG data transmitted thereto, for example, over a predetermined out-of-band channel. Such EPG data is extracted by a data extractor 203 coupled to tuner 204; and the extracted EPG data is written into a memory 206 under the control of microprocessor 205. For example, data extractor 203 may include separating circuits tuned to the out-of-band channel for separating the EPG data. Other conventional data extraction techniques may be used. Memory 206 thus stores the EPG data.

Such EPG data is transmitted to tuner 204 periodically and contains the data represented by Table 1 for each and every television program that may be received by the television receiving apparatus shown in FIG. 1 during a selected time interval. For example, if the television receiving apparatus is connected to a cable distribution system, the EPG data contains television program information associated with all of the television programs that are transmitted over this cable distribution system. If the television receiving apparatus is coupled to a direct satellite broadcast system, the television program information included in the transmitted EPG data is associated with all of the television programs that are transmitted to and receivable by the television receiving apparatus over this direct satellite broadcast system. If the television receiving apparatus simply receives over-the-air broadcasts, the television program information associated with all of the television programs transmitted into the reception area of this television receiving apparatus is included in the EPG data. Thus, memory 206 stores the EPG data, including the rating data, associated with each television program that can be received by the television receiving apparatus during the selected time interval. This time interval may be an hour, a number of hours, a day, a number of days, a week, a month or a longer time interval. Typically, the time interval is a week and memory 206 thus stores television program information associated with all television programs that are receivable by the television receiving apparatus during that week.

When tuner 204 is tuned by microprocessor 205 in response to channel selection signals supplied thereto by, for example, IR receiver 202, the television program information associated with the selected channel is read from memory 206 for the purpose of comparing the rating data included in that television program information to a predefined rating code that had been generated previously by the user of the television receiving apparatus.

For example, if the television receiving apparatus is included in a cable distribution network and tuner 204 is tuned to channel 25, the television program information stored in memory 206 and associated with channel 25 is read from the memory and the rating data included in such television program information is compared to the rating code previously generated and stored. A similar retrieval from memory 206 of the television program information associated with the channel to which tuner 204 is tuned is carried out if the television receiving apparatus is included in a direct satellite broadcast system or is adapted to receive over-the-air transmissions.

If the rating data retrieved from memory and associated with the television program that has been selected by the viewer exceeds the rating code, thus indicating that the selected television program is not acceptable, microprocessor 205 inhibits the television program transmitted over this channel from being displayed on display 208.

For example, the microprocessor may inhibit tuner 204 from supplying the video signals to display 208 or, alternatively, may inhibit display 208 from processing and displaying the video signals.

Alternatively, if the rating data does not exceed the predefined rating code, tuner 204 and display 208 are not inhibited but, rather, are enabled to display the television program that is received over this selected channel.

It will be recognized that the predefined rating code established by the viewer is intended to represent the content rating criteria of those television programs which are acceptable. Stated otherwise, the rating code represents the content rating criteria of programs which the viewer wishes to inhibit from being displayed.

If the value of the rating data retrieved from memory 206 exceeds the predefined rating code, the television program associated with that rating data thus satisfied the predetermined content rating criteria and display of that television program is inhibited. However, if the value of the rating data does not exceed the predefined rating code, the associated television program does not satisfy the predetermined content rating criteria and that program thus may be displayed.

As another advantageous feature of the present invention, it is desirable to display to the viewer alternative acceptable television programs that can be received on other channels during the same time interval as the unacceptable television program which had been selected. For example, if tuner 204 is tuned to channel 25 at 8:00 p.m., but the television program broadcast over channel 25 at 8:00 p.m. is not acceptable by reason of the fact that the rating data associated with this television program satisfies the predetermined content rating criteria represented by the predefined rating code, it is desirable to display a list of acceptable television programs transmitted at 8:00 p.m. over other channels to which the television receiving apparatus may be tuned. This list of acceptable television programs is created from the television program information stored in memory 206. For example, when it is determined that the television program to which tuner 204 is tuned is unacceptable (as by comparing the rating data associated with that program to the predefined rating code), microprocessor 205 may generate the list by selecting from memory 206 another channel, such as the next adjacent channel, comparing the rating data associated with the television program receivable on that other channel during the time interval that the unacceptable television program is broadcast (for example, in the present example, the rating data associated with the television program receivable on the adjacent channel at 8:00 p.m. is compared to the predefined rating code), and if the television program receivable on that other channel does not satisfy the predetermined content rating criteria (that is, if its rating data does not exceed the predefined rating code), the television program information associated with the television program receivable on that other channel is added to the list. The microprocessor then repeats this operation for the next adjacent channel, and so on, until the television program information associated with all receivable channels has been examined. As a result, a list of only acceptable television programs is compiled; and this list is displayed. A character generator 207 is provided to display this list in alphanumeric (or text) characters, under the control of microprocessor 205.

Alternatively, microprocessor 205 may periodically create the aforementioned list in the manner just described. For example, a list of acceptable television programs may be compiled at every half-hour, awaiting automatic display in the event that tuner 204 is tuned to a channel over which an unacceptable program is being transmitted.

As yet another alternative, the aforementioned list of acceptable television programs may be compiled periodically by microprocessor 205 and may be displayed in response to a suitable viewer-generated "list display" command supplied to the microprocessor. This command may be generated by remote control unit 201, received by IR receiver 202 and supplied to microprocessor 205, whereupon the compiled list is displayed on display 208.

It will be appreciated that the television program information included in the EPG data is transmitted to tuner 204 periodically; and as individual items in the television program information change, the contents of memory 206 are updated accordingly. It is expected, therefore, that the list compiled by microprocessor 205 likewise will change periodically as the contents of the memory are updated. For example, a television program received over a particular channel at, for example, 8:30 p.m. may be acceptable, but at 9:00 p.m. that very same channel may broadcast a television program that is not acceptable. As the rating data included in the television information changes, the determination of whether particular channels broadcast acceptable television programs likewise will change.

Although not described in detail, it will be appreciated, that microprocessor 205 may be constructed as a conventional microprocessor, such as a relatively inexpensive, small eight-bit controller or a powerful, high-speed microprocessor for example, a "486"-type microprocessor or Pentium microprocessor manufactured by Intel Corp.

Figure 2:
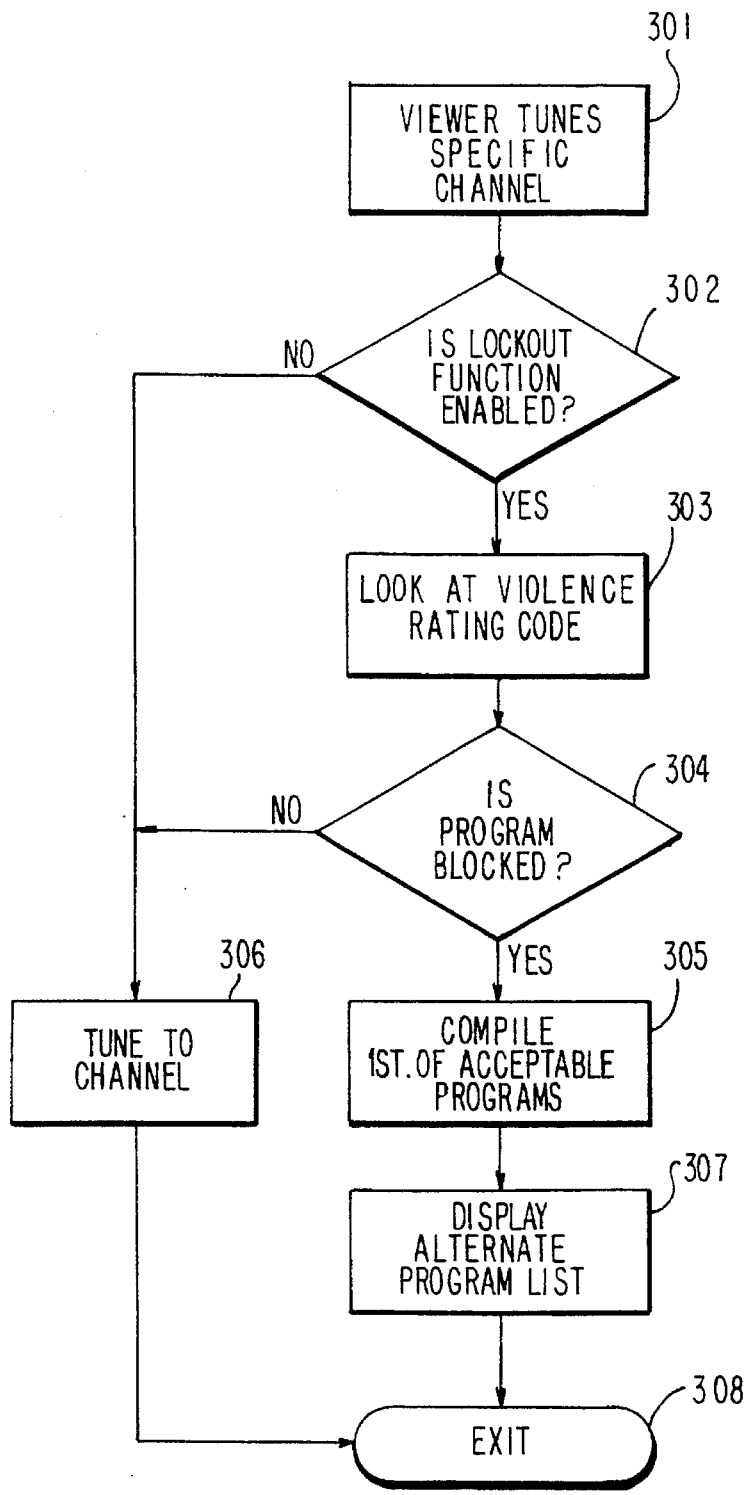
FIG. 2 is a flow chart which represents the manner in which the present invention selectively inhibits the display of unacceptable television programs.

The manner in which microprocessor 205 determines whether the television program received over a selected channel is to be displayed or locked out (i.e. inhibited) is explained in conjunction with the flowchart shown in FIG. 2. It is assumed that memory 206 stores the television program information associated with those television programs that are receivable over all channels before a determination is made that a particular program is acceptable. As mentioned above, such television program information is transmitted periodically as EPG data. When a particular channel is selected for reception, as represented by instruction 301, the microprocessor advances to inquiry 302 to determine if the rating data associated with the television program then received over that selected channel is to be examined (that is, the microprocessor inquires as to whether the lock-out function is enabled). The enabling or disabling of the lock-out function may be effected simply by operating a suitable switch, by entering an encryption code (so as to prevent override by, for example, children or other viewers) or by selectively disabling this function as by transmitting a suitable code to a cable head-end controller (e.g., by placing a telephone call to the customer service representative of the cable distribution system). If inquiry 302 is answered in the negative, that is, if the lock-out function is not enabled, the microprocessor executes instruction 306 and controls the tuner to tune to the selected channel.

However, if inquiry 302 is answered in the affirmative, the rating data associated with the television program then being received over the selected channel is compared to the pre-defined rating code, as represented by instruction 303.

If the rating data associated with that television program exceeds the pre-defined rating code, inquiry 304 is answered in the affirmative and the television program is inhibited from being displayed. That is, the program is blocked. However, if the rating data does not exceed the pre-defined rating code, inquiry 304 is answered in the negative, the television program is not blocked and the microprocessor enables the television program then being broadcast on the selected channel to be displayed.

If inquiry 304 is answered in the affirmative, the television program is blocked from being displayed and the microprocessor advances to instruction 305 to compile the list of acceptable television programs, which is derived from the television program information then stored in memory 206. After compiling this list, the microprocessor advances to instruction 307 to display this list of acceptable television programs. It is appreciated that this list of acceptable programs is displayed as text data generated by character generator 207.

Figure 3:
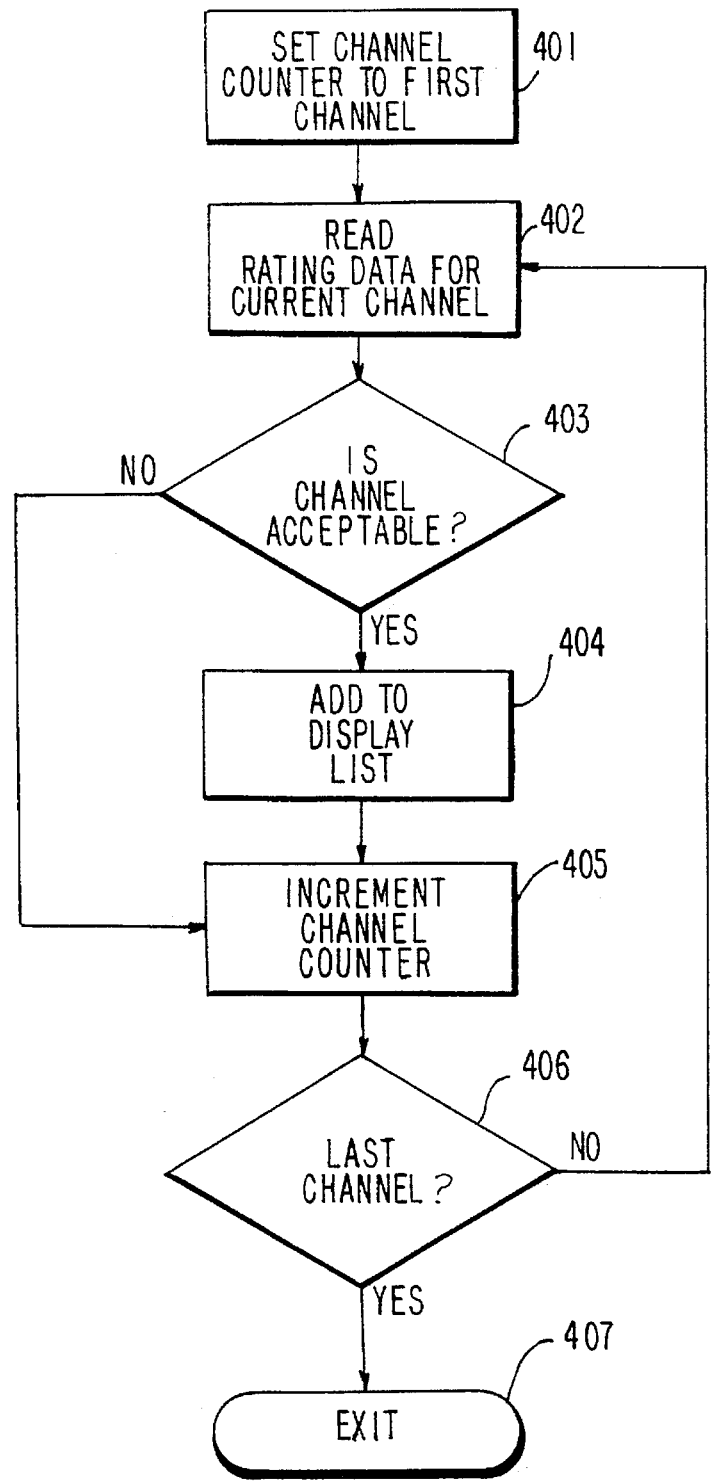
FIG. 3 is a flow chart which represents the manner in which the present invention creates and displays a list of acceptable television programs that may be viewed by a viewer.

The list compiled by the microprocessor is generated periodically, as when the television program information transmitted as EPG data to the television receiving apparatus changes, or when tuner 204 is tuned to a channel over which an unacceptable program then is being transmitted. Regardless of the conditions which trigger the compilation of the list, FIG. 3 is a flow chart which represents the manner in which that list is compiled.

Initially, a channel counter is set by instruction 401 to a channel number which, for example, may be the next highest channel number adjacent the particular channel to which tuner 204 presently is tuned. Alternatively, instruction 401 may set the channel counter to any arbitrary channel number. Then, instruction 402 is executed, wherein the microprocessor reads the rating data included in the television program information associated with that channel. Inquiry 403 then is made to determine if the television program which is being broadcast on that channel is acceptable. It is appreciated that this inquiry is determined by comparing the rating data associated with that channel with the pre-defined rating code. If inquiry 403 is answered in the affirmative, the television program information associated with this channel is added to the display list being compiled, as represented by instruction 404. Then, microprocessor 205 advances to instruction 405 to increment the channel counter.

If inquiry 403 had been answered in the negative, the television program information associated with this channel is not added to the display list, instruction 404 is skipped, and the microprocessor advances directly to instruction 405 to increment the channel counter. Then, inquiry 406 determines if the channel to which the channel counter has been incremented is the last channel to be examined. If not, the microprocessor returns to instruction 402 and the operations discussed above in conjunction with instructions 402–406 are repeated. Eventually, the television program information associated with the last channel is examined and inquiry 406 is answered in the affirmative. At that time, the microprocessor exits this routine and the list is completed. This list then may be displayed automatically (instruction 307 of FIG. 2), as when tuner 204 is tuned to a channel over which an unacceptable program is being transmitted. Alternatively, or in addition thereto, the compiled list may be displayed upon actuating a "display list" command, as mentioned above.

Figure 4:
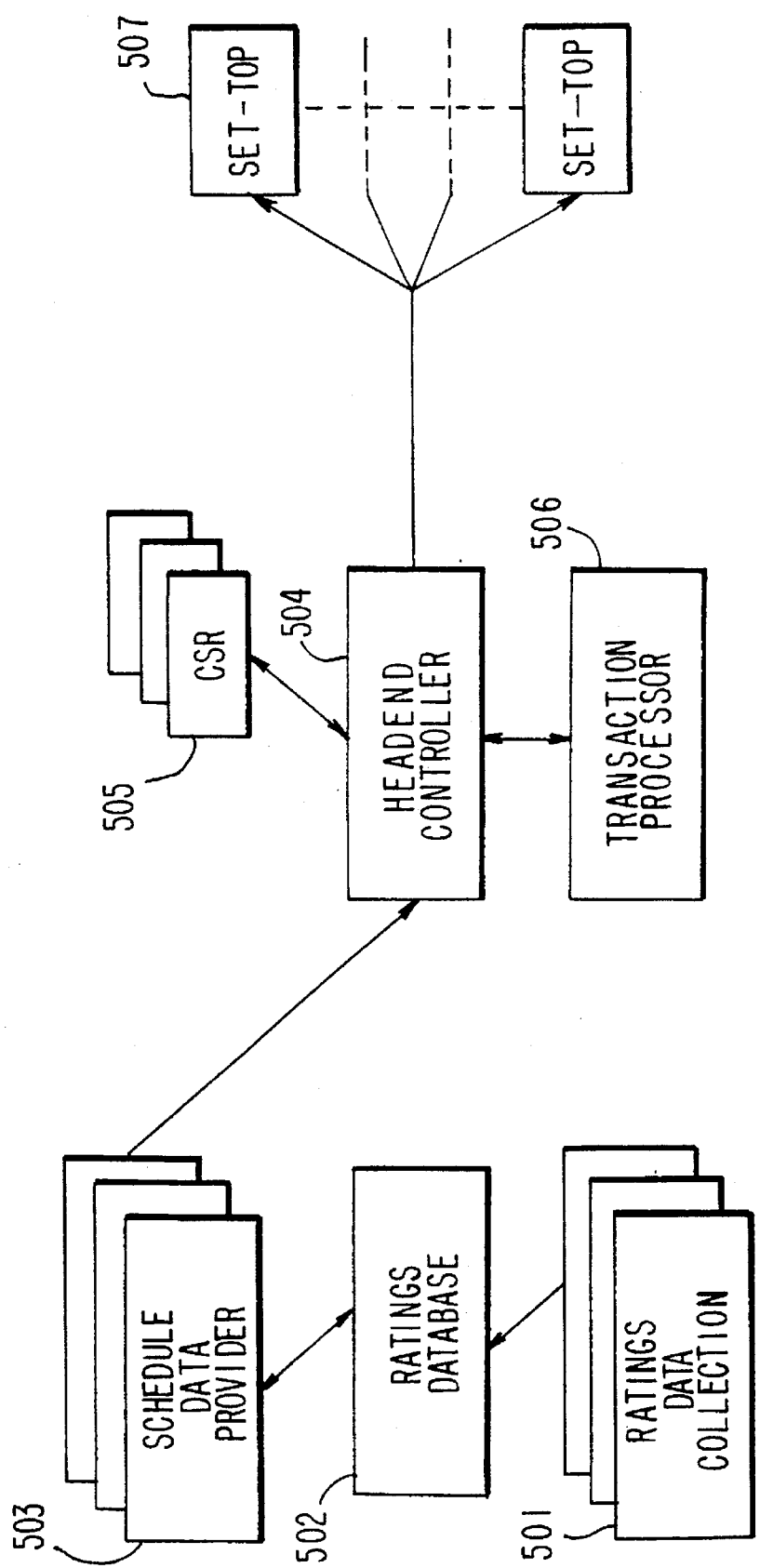
FIG. 4 is a block diagram representing the manner in which television program rating data is transmitted to television receivers, for example, in a cable distribution or direct satellite broadcast system.

The manner is which rating data is added to EPG data and transmitted to television receiving apparatus for storage in memory 206 is schematically represented by the block diagram shown in FIG. 4.

It is expected that a panel of experts (or a number of selected viewers) will observe particular television programs which, to some viewers, may be unacceptable. For example, it need not be necessary for all television programs to be previewed. Rather, only those television programs which contain some violence or some profanity or some other predetermined acts which can be construed as unacceptable need be viewed. Such programs are retrieved from a store of programs having preselected rating data, such as those programs which correspond to the motion picture rating PG-13 and above.

The experts or viewers in this panel are expected to designate a rating data for each such television program as a function of the intensity of the predetermined acts (e.g. the level of intensity of violence) and the frequency of occurrence of those acts (e.g. the number of violent scenes which are present in the television program). A suitable numerical rating data is assigned to each such television program and stored in a rating database 502. This database also includes the television program information depicted in aforementioned Table 1.

The television program information, including the rating data, stored in rating database 502 for all television programs, is compiled by a schedule data provider 503, which may be a suitable program schedule service, and transmitted to a head-end controller 504 in, for example, a cable distribution system. This EPG data may comprise daily program schedule data, weekly program schedule data or monthly program schedule data. The television program information associated with each television program that may be transmitted daily, weekly or monthly from head-end controller 504 to subscribers in the cable distribution system is transmitted periodically and, preferably over a channel distinct from those channels over which the television programs are transmitted. It will be appreciated that the transmission of EPG data from the schedule data provider to the head-end controller may be by way of conventional communication channels, such as telephone lines, optical channels, predetermined radio channels, or the like. Thus, EPG data is supplied to head-end controller 504 having, for example, the data construction shown in Table 1, for all of the television programs that may be transmitted from the head-end controller to cable subscribers during a predetermined time period, such as a week.

The television schedule data may identify those television programs that are transmitted for a greater period of time than simply one week, and it is contemplated that the EPG data stored at the head-end controller may represent those television programs that are to be transmitted over a 2, 3, 4 or more week period.

Head-end controller 504 transmits this television program information over the cable distribution system to set-top converters 507. As discussed above, this EPG television program information may be transmitted periodically such that each set-top converter is supplied with current television program information. Information associated with a television program that has ended is deleted from such EPG data. Preferably, the set-top converters include a receiver that always is tuned to the out-of-band channel over which the EPG data is transmitted from head-end controller 504. In this manner, whenever updated television program information is transmitted, such up-dated information is received and stored at the set-top converters.

In one embodiment, the lock-out feature of the present invention is enabled by a suitable enable/disable control signal transmitted to the set-top converters by head-end controller 504 over the cable distribution network. A "lock-out enable" command may be transmitted from the head-end controller to a particular subscriber when that subscriber specifically requests to have this lock-out feature enabled. For example, the subscriber may telephone the customer service representative 505 of the cable distribution system and request that the "lock-out enable" command be transmitted. It is expected that a fee will be charged for this lock-out service; and in addition to transmitting the "lock-out enable" command from the head-end controller to the subscriber, an indication that this service has been requested will be sent to a transaction processor 506 for suitable billing to the customer. If desired, the generation of the "lock-out enable" command may be effected by the transaction processor itself.

Once activated, this lock-out feature may be disabled if the subscriber once again telephones a customer service representative and requests such disablement. To provide adequate security such that the lock-out feature is not overridden by young viewers, suitable codes (such as personal identification numbers) may be used to verify the authenticity of a request to disable the lock-out feature.

While the present invention has been particularly shown and described with reference to a preferred embodiment, it will be readily appreciated that various changes may be made without departing from the spirit and scope of the invention. For example, the EPG data need not be transmitted over a separate, distinct channel but, rather, may be multiplexed onto one or more, or all of the channels that are receivable by the television receiving apparatus. Also, although the television receiving apparatus illustrated in FIG. 1 has been described as being present in a set-top converter for cable or direct satellite broadcast distribution systems, or may be provided directly in a television receiver or video recorder, it is understood that such apparatus may be disposed in a separate stand-alone unit of the type which has been proposed in conjunction with receiving and displaying electronic program guides.

It is intended that the appended claims interpreted as including the embodiment discussed above, those various alternatives which have been described and all equivalents thereto.

What is claimed:

1. A method of selectively inhibiting television receiving apparatus from displaying those television programs which satisfy predetermined content ratings criteria, comprising the steps of:

storing television program information associated with television programs that are receivable by said television receiving apparatus during a selected time interval, the information associated with a respective television program including channel data representing the channel on which that program is received, title data representing the title of that program and rating data representing the content of that program;

storing a rating code representing the content ratings criteria of programs which a viewer wishes to inhibit from being displayed;

selecting a channel to display the television program that is received on the selected channel;

comparing the rating data associated with said television program that is received on said selected channel with said stored rating code to determine if said television program satisfies said predetermined content ratings criteria;

inhibiting said television receiving apparatus from displaying said television program if it is determined that said television program satisfies said predetermined content ratings criteria;

generating a list of television program information associated with those television programs currently receivable on other channels which do not satisfy said predetermined content ratings criteria; and automatically displaying said generated list of television program information if it is determined that said television program satisfies said predetermined content ratings criteria.

2. The method of claim 1 wherein the step of storing television program information comprises transmitting from a source to said television receiving apparatus a viewing schedule of those television programs to be transmitted from said source during a predetermined time period, said viewing schedule including said channel, title and rating data of each said television program; and storing said viewing schedule at said television receiving apparatus.

3. The method of claim 2, wherein said viewing schedule further includes start time data representing the time at which the transmission of each said television program begins; program length data representing the duration of each said television program; program type data representing the type of each said television program; and program description data representing a summary of each said television program.

4. The method of claim 2 wherein said rating data represents frequency of occurrence and level of intensity of predetermined acts in said television program.

5. The method of claim 4 wherein said predetermined acts are acts of violence.

6. The method of claim 2 wherein said viewing schedule is transmitted from said source to said television receiving apparatus in a channel distinct from those channels over which said television programs are transmitted.

7. The method of claim 2 wherein said selected time interval is included within and is a submultiple of said predetermined time period.

8. The method of claim 7 wherein said selected time interval is a multiple of a half hour and said predetermined time period is a week.

9. The method of claim 1 wherein said step of storing said rating code comprises entering by a user of said television receiving apparatus a code representing predetermined acts expected in a television program and frequency of occurrence and level of intensity of said predetermined acts.

10. The method of claim 9 wherein said rating code comprises a numerical value and said rating data comprises a numerical value; and wherein said step of comparing determines if the numerical value of said rating data exceeds the numerical data of said rating code to thereby satisfy said predetermined content ratings criteria.

11. The method of claim 1 wherein said step of generating a list of television program information associated with those television programs having rating data which do not satisfy said predetermined content ratings criteria comprises: (a) selecting another channel, (b) comparing the rating data associated with the television program receivable on said other channel during said selected time interval to said stored rating code to determine if the television program receivable on said other channel satisfies said predetermined content rating criteria, (c) adding to a list the television program information associated with the television program receivable on said other channel if said predetermined content ratings criteria are not satisfied, and (d) repeating steps (a) through (c) until all other channels have been selected.

12. The method of claim 2 wherein an updated viewing schedule is transmitted periodically.

13. Apparatus for selectively inhibiting television receiving apparatus from displaying those television programs which satisfy predetermined content ratings criteria, comprising:

a memory for storing television program information associated with television programs that are receivable by said television receiving device during a selected time interval, the information associated with a respective television program including channel data representing the channel on which that program is received, title data representing the title of that program and rating data representing the content of that program;

means for storing a rating code representing the content ratings criteria of programs which a viewer wishes to inhibit from being displayed;

means for selecting a channel to display the television program that is received on the selected channel;

means for comparing the rating data associated with said television program that is received on said selected channel with said stored rating code to determine if said television program satisfies said predetermined content ratings criteria;

means for inhibiting said television receiving apparatus from displaying said television program if it is determined that said television program satisfies said predetermined content ratings criteria;

means for generating a list of television program information associated with those television programs currently receivable on other channels which do not satisfy said predetermined content rating criteria; and means for automatically displaying said generated list of television program information if it is determined that said television program satisfies said predetermined content ratings criteria.

14. The apparatus of claim 13 wherein said memory is operable to store television program information transmitted from a source and further including a viewing schedule of those television programs to be transmitted from said source during a predetermined time period, said viewing schedule including said channel, title and rating data of each said television program; said viewing schedule being stored in the memory at said television receiving device.

15. The apparatus of claim 14, wherein said viewing schedule further includes start time data representing the time at which the transmission of each said television program begins; program length data representing the duration of each said television program; program type data representing the type of each said television program; and program description data representing a summary of each said television program.

16. The apparatus of claim 14 wherein said rating data represents frequency of occurrence and level of intensity of predetermined acts in said television program.

17. The apparatus of claim 16 wherein said predetermined acts are acts of violence.

18. The apparatus of claim 14 wherein said viewing schedule is transmitted from said source to said television receiving device in an out-of-band channel distinct from those channels over which said television programs are transmitted.

19. The apparatus of claim 14 wherein said selected time interval is included within and is a submultiple of said predetermined time period.

20. The apparatus of claim 19 wherein said selected time interval is a multiple of a half hour and said predetermined time period is a week.

21. The apparatus of claim 13, further comprising means for entering by a user of said television receiving device said rating code which represents predetermined acts expected in a television program and frequency of occurrence and level of intensity of said predetermined acts.

22. The apparatus of claim 21 wherein said rating code comprises a numerical value and said rating data comprises a numerical value; and wherein said means for comparing is operable to determine if the numerical value of said rating data exceeds the numerical data of said rating code to thereby satisfy said predetermined content ratings criteria.

23. The apparatus of claims 13 wherein said means for generating a list of television program information associated with those television programs having rating data which do not satisfy said predetermined content ratings criteria comprises: means for automatically selecting another channel, means for operating the comparing means to compare the rating data associated with the television program receivable on said other channel during said selected time interval to said stored rating code to determine if the television program receivable on said other channel satisfies said predetermined content ratings criteria, and means for adding to a list the television program information associated with the television program receivable on said other channel if said predetermined content ratings criteria are not satisfied.

\* \* \* \* \*